Sept. 30, 1969      J. D. HARPER      3,469,601
CONDUIT SUPPORT APPARATUS
Filed July 22, 1966      2 Sheets-Sheet 2
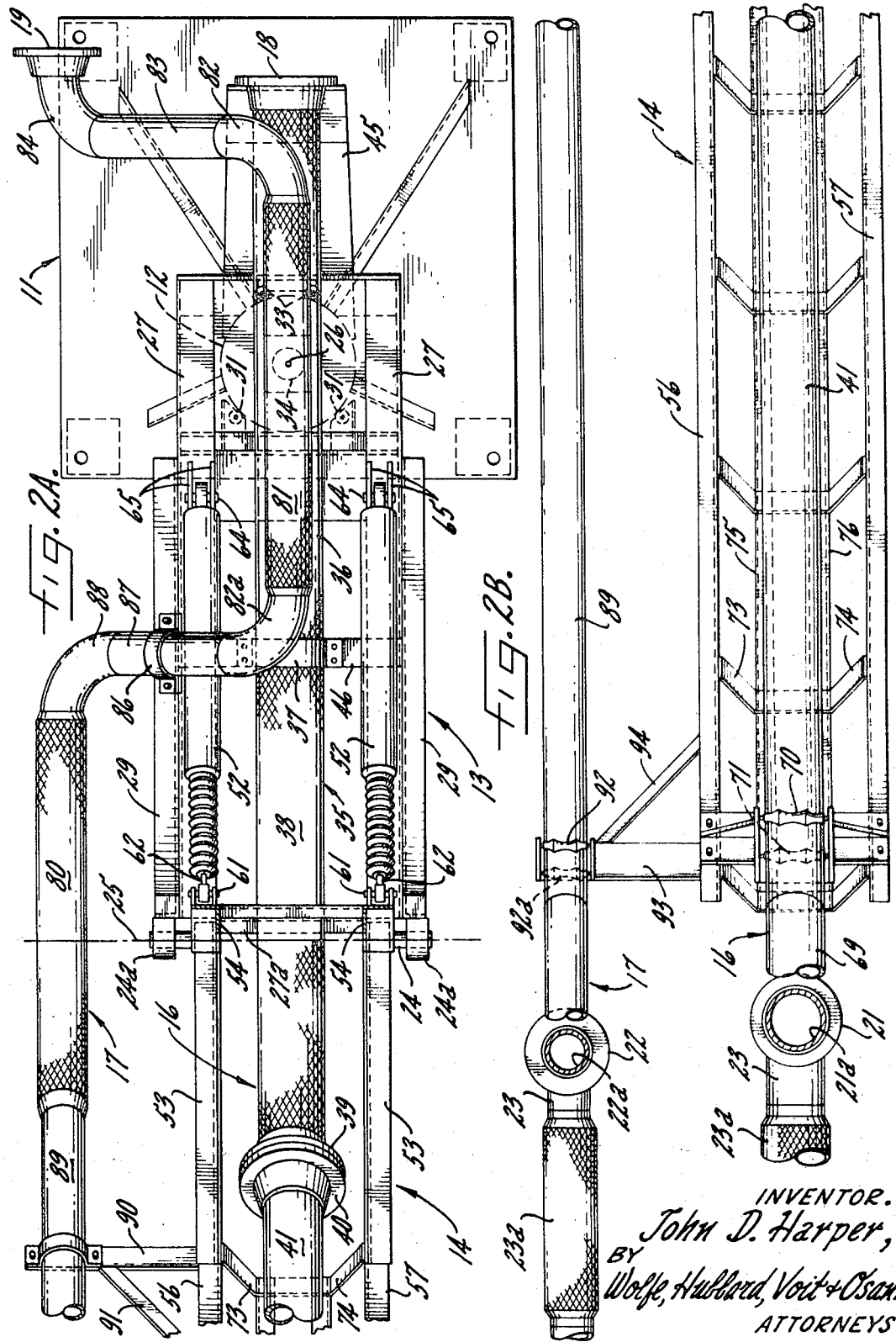
INVENTOR.
John D. Harper,
BY
Wolfe, Hubbard, Voit & Osann
ATTORNEYS.

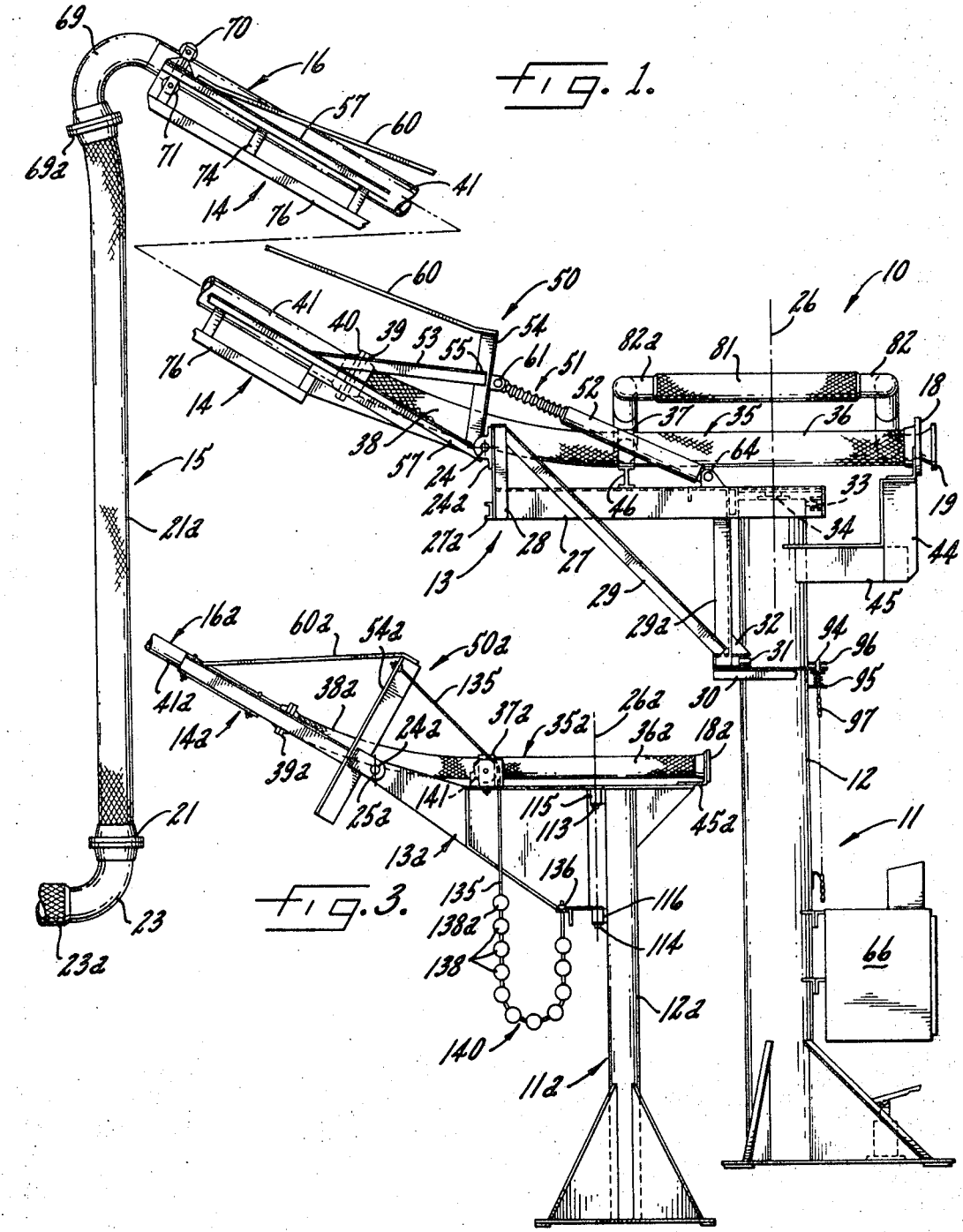

United States Patent Office 3,469,601
Patented Sept. 30, 1969

3,469,601
CONDUIT SUPPORT APPARATUS
John D. Harper, 111 W. Washington St.,
Chicago, Ill. 60602
Filed July 22, 1966, Ser. No. 567,099
Int. Cl. E03b; E03c; F17d
U.S. Cl. 137—615          6 Claims

ABSTRACT OF THE DISCLOSURE

A fluid handling apparatus consisting of a frame supporting flexible metallic hose. The support allows sections of the hose to either flex about a horizontal or vertical axis.

---

This invention relates generally to fluid transfer apparatus having an assembly of conduits connected to one another for the transfer of fluid material between containers.

When transferring fluids to a movable container, such as on a truck, railroad car, ship or barge, the coupling connection of the fluid handling apparatus should have a considerable freedom of movement to facilitate the initial connection to the movable container because the movable container may not be in a precisely located position. Also, with transferring of considerable amounts of fluid, the movable carrier may change its position vertically as with the compressing or expanding of springs or the raising or lowering of the ship in the water. With ships and barges, there is always the possibility of horizontal movement as well as vertical movement.

With some installations, the desired freedom of movement of the coupling connection cannot be afforded by a rotatable pipe joint because the material being transferred may have a particularly deleterious effect on a pipe joint causing it to stick or leak. For instance, low surface tension materials may leak through a rotatable pipe joint and cryogenic materials may cause the rotatable pipe joint to stick. While it has been proposed to employ flexible metallic hoses to achieve flexibility and fredom of movement, it is a well known characteristic of flexible metallic hoses that they should be flexed only in a single plane. Also, metallic hoses should not be subjected to a twisting torque, such as might result from flexing the hose to bend in more than one plane as by a bending movement having both vertical and horizontal components.

Accordingly, an object of the present invention is to provide a freedom of movement to an assembly of conduits of a fluid transfer apparatus by arranging a flexible metallic hose to bend at separate and distinct portions without subjecting the metallic hose to a twisting torque.

A more specific object of the invention is to convert a movement of a terminal connection of a fluid conduit unit into components of movement normal to one another for flexing separate and distinct sections of a metallic hose in one plane only without twisting the metallic hose.

A further object of the invention is a fluid handling apparatus having spaced horizontal and vertical axes with a section of flexible metallic hose spanning each of the respective axes and bending only in a plane normal to its spanned axis whereby simultaneous flexing of the sections provides a universal freedom of movement to the conduit on the boom.

A further object of the invention is to afford generally universal flexing of dual conduit units at metallic hoses by arranging for bending first sections of the respective flexible metallic hoses in a horizontal plane and second sections in a vertical plane and at spaced axes which are normal to each other.

Other objects and advantages of the invention will become apparent from the following detailed description taken in conjunction with the accompanying drawing, in which FIGURE 1 is an elevational view of a fluid transfer apparatus embodying the present invention.

FIGS. 2A and 2B illustrate a plan view of the transfer apparatus of FIG. 1.

FIG. 3 illustrates another embodiment of the invention having a variable counterweight device for a fluid transfer device.

While the invention will be described in connection with certain preferred embodiments particularly suited for handling cryogenic materials, it will be understood that I do not limit the invention to those embodiments and particularly to the handling only of cryogenic materials. It is intended to cover all alternatives and modifications and equivalents as may be included in the spirit and scope of the invention as defined by the appended claims.

Referring now to the drawings and more particularly to FIG. 1, there is illustrated a fluid transfer apparatus 10 with a support 11 including an upstanding, cylindrical column 12 and a pivotal frame 13 supporting a boom 14 carrying conduit means 15. As best seen from FIGS. 2A and 2B, the conduit means 15 includes a pair of conduit units 16 and 17 each for carrying a fluid and, in a typical application, the larger conduit unit 16 carries liquids while the smaller conduit unit 17 carries a vapor.

The support 11 is secured to a stationary foundation, and stationary conduits (not shown) lead to flanged couplers 18 and 19 (FIG. 2A) at the supported ends of the conduit units 16 and 17, respectively. Fluid flow is between flanged couplers 18 and 19 at the stationary end of the conduit units and flange coupler units 21 and 22 (FIG. 2B) at the movable ends of the conduit units. The flange couplers 21 and 22 connect downwardly extending hoses 21a and 22a to the elbow conduits 23 which, in turn, support hoses 23a extending to a movable carrier such as a vehicle, railroad tank car, or ship.

To afford a generally universal movement to the units 16 and 17 leading to the movable carrier, the boom 14 is pivotally attached to the frame 13 by a pivot pin 24 which defines a horizontal axis 25 (FIG. 2A) about which the boom may pivot vertically, and the frame is supported for turning horizontally about a vertical axis 26 (FIG. 1) through the center of the column 12. The frame 13 includes a generally horizontal platform formed by longitudinal beams 27 and cross beams 27a secured together and, mounted at the forward end of the longitudinal beams, are upstanding braces 28 having brackets 24a for the pivot pin 24. The upper ends of the braces are welded to downwardly and rearwardly extending legs 29, which are joined to vertical legs 29a at an annular collar 30 encircling the column. The collar supports spaced rollers 31 which roll about the periphery of the column and which are journalled for rotation about a vertical axis in a bracket 32 fixed to the legs and to the collar 30. At the upper and rearward portion of the frame 13, spaced rollers 33 are secured in brackets to roll about the periphery of the column 12 and about their vertical axes. Secured to the longitudinal and cross beams and disposed at the axis 26 is a downwardly extending boss 34 which is received in a circular member at the upper end of the column to assist the spaced rollers 31 and 33 in supporting and guiding the frame 13 for turning about the column.

The boom 14 is a rigid truss with an inner end pivotally mounted by the pivot pin 24 to the frame 13 and an outer end free for vertical swinging movement. Therefore, a downward pull on the flanged coupler 21 causes the boom 14 to pviot downwardly and counterclockwise about the pivot pin 24. A sideways or horizontal force exerted on the flanged coupler 21 is transmitted through the boom 14 and pin 24 to the framework 13 which revolves about the axis 26 through the center of the column 12. When revolving, the spaced sets of rollers 31 and 33 on the frame 13 roll about the peripheral surface of the column 12. When the flange coupler 21 is receiving forces tending to move obliquely the boom 14 and its conduit means 15, it will be seen that the fluid transfer apparatus 10 seprates such a movement into distinct vertical and horizontal components with the vertical components of movement being about the pivot pin 24 and the horizontal components of movement being about the axis 26 of the column 12.

When handling cryogenic materials or materials having a low surface tension, resilient seals may be deleteriously affected by the material and crack or leak at a joint. Also, pipe joints of the swivel, swing or ball types tend to become stuck or to leak. Therefore, it is desirable and often necessary that the fluid transfer conduit means 15 be free of resilient gaskets and rotatable joints while still being positionable and flexible to facilitate the initial alinements and initial connections as well as to permit relative movements during the time of fluid transfer. It will be appreciated that loading or unloading of a ship or barge often results in ship movement vertically in the water and that, even when tied up, the ship or barge experiences a certain limited generally horizontal movement. Therefore, the conduit means at the coupler 21 should have considerable freedom of movement in both vertical and horizontal directions.

Any vertical or horizontal movement of the coupler 21 relative to the opposite and stationary coupler 18 must be accompanied by a bending movement of the conduit units 16 and 17. While the metallic flexible hoses may be employed in the conduit units to afford bending, the metallic hoses, however, should be flexed in only one plane at a time, for example, either a horizontal or vertical plane only, and should not be subjected to a twisting torque.

In accordance with the present invention, the fluid transfer apparatus 19 avoids rotatable pipe joints but provides general universal movement by breaking movement of the conduit units 16, 17 into two longitudinally spaced components of movement normal to one another. More specifically, each of the units 16, 17 includes longitudinally spaced flexible hose sections with one section supported for movement about the axis 25 and the adjacent section supported for movement about the right angled axis 26. The flexible hose section of the dual units 16, 17 are arranged so that a flexible section of each unit swings about the same axis 25 or 26.

In the FIG. 1 embodiment, the conduit unit 16 includes a flexible metallic hose 35 secured to the boom 14 and the frame 13 so that one section is in the plane of the horizontal axis 25 and another section is in a plane through the vertical axis 26 at the center of the column 12. One end of the metallic hose 35 is connected to the flanged coupler 18 which is held stationary by upwardly extending legs 44 of an angle bracket 45 which is suitably affixed as by welding to the column 12. Consequently, the end of the hose 35 at the flanged coupler 18 is fixedly located at a predetermined position determined by the bracket 45. Extending from the coupler 18 is a right hand section 36 of the flexible hose 35 which is disposed generally horizontally and clamped to a spaced bracket 37 secured to the frame 13. From the bracket 37, a left-hand section 38 of the hose extends to a coupler 39 secured in fluid tight relationship to a coupler 40 on a non-flexible pipe 41 cradled in the boom 14. The hose 35 is secured through the bracket 37 to a transverse beam 46 fixed to and spanning the longitudinal beams 27 of the frame 13. Thus, the flexible metal hose 35, which is a unitary hose without joints or seals from its flanged coupler 18 to its flanged coupler 39 on the boom 14, is clamped to the frame only at the bracket 37 intermediate the ends of the hose.

An important aspect of the present invention is that the metallic hose 35 does not have a section subjected to torque or to flexing in more than a single plane. Under the present invention, the vertical flexing takes place in the hose section 38 and the horizontal flexing takes place in the hose section 36 because the bracket 37 holds and clamps the hose 35 rigid to the beam 46 and the frame 13. The hose 35 is clamped so rigidly by the bracket 37 intermediate the axes 25 and 26 that the flexing in one section of the hose 36 or 38 does not cause the same kind of flexing in the other hose section. For instance, flexing in a vertical plane of the hose section 38 to the position shown in FIG. 1, does not cause such an appreciable vertical flexing of the hose section 36, which if combined with a horizontal flexing could produce a deleterious twisting effect on the metallic hose 35. Thus, a bending movement having vertical and horizontal components of movement is broken into two longitudinally spaced bending movements in a continuous metallic hose without the use of any swivel, swing or ball joints at the location of the bracket 37.

In the embodiment of FIG. 1, the pipe joints are relieved of undesirable stress and strain caused by the large cantilevered load at the end of the boom 14 by a counterbalancing means 50 including a linear actuator 51 in the form of a hydraulic cylinder 52 coupled between the boom 14 and the framework 13. Such a counter-balancing means is described fully in U.S. Patent No. 3,114,392. Generally, the counter-balancing means 50 includes a yoke formed of a pair of truss members 54 extending generally at right angles to the boom 14 and a pair of obliquely extending brace members 53 having one end secured inwardly at 55 to a truss member 54 and the other end secured to side angles 56 and 57 (FIG. 2A) of the boom 14. Braces 60 are secured between the upper ends of truss members 54 and the outer ends of the boom 14.

As best seen in FIG. 2A, the respective truss members 54 of the yoke are connected by pins 61 to the piston rods 62 of the hydraulic cylinders 52. The hydraulic cylinders are pivotally mounted by pins 64 at their lower ends to brackets 65 on the frame 13. The cylinders are of the linear double acting type and, with appropriate pressure applied thereto, serve to counter-balance the cantilever weight of the boom 14 and conduit means 15. The hydraulic cylinders 52 are controlled from a hydraulic console 66 fixed to the column 12.

The conduit unit 16 contacts the boom 14 of the support 11 at only a few spaced locations in order to minimize heat transfer by conduction. Also, the conduit unit 16 is supported on the boom 14 in a manner to minimize frictional resistance of the boom 14 and pipe 41 due to expansion or contraction of the conduit unit 16. To this end, the outer free end of the boom 14 has a pair of upper and lower rollers 70 and 71 between which is clamped the outer end of the pipe 41 which is connected to an elbow 69 having a flanged connection 69a with the flexible metallic hose 21a. With a change in size, the pipe 41 may roll across the rollers 70 and 71 thereby minimizing frictional resistance to expansion and contraction of the pipe. To minimize heat transfer to the boom 14, the pipe 41 is spaced above and held in spaced relationship to the series of cross members 73 and 74 (FIG. 2B) and interconnected inner, central, longitudinally extending members 75 and 76. Thus, the boom has heat transferring connections with the pipe 41 only at the rollers 70 and 71.

An important aspect of the present invention is that the fluid transfer apparatus 10 is capable of the same flexibility with a second conduit unit 17 also having metallic hoses and no swivel, ball or turning joints. However, where the hose 35 is unitary between the coupler 18 and the pipe 41, the conduit unit 17 has separated and offset metallic hose or hose sections 80 and 81 (FIG. 2A). The metallic hose 80 is alined in the same, generally horizontal plane as the hose section 38 of the hose 35 with the horizontal axis 25 directed through the hose 80. The metallic hose 81 is positioned vertically over the hose section 36 of the hose 35 to be in a vertical plane through the axis 26. Thus, the conduit unit 17 is rigidly supported by the boom 14 and the flexing in the vertical direction takes place in the flexible hose 80 and the flexing in a horizontal direction takes place in the flexible hose 81.

The right end of the hose 81 (FIG. 2A) is connected to a rigid elbow 82 which in turn is connected to a downwardly and rearwardly directed rigid pipe 83 leading to a rigid elbow 84 connected to the coupler 19. The left hand end of the flexible hose 81 is also connected to a rigid pipe elbow 82a and to a downwardly extending pipe 87. A further rigid elbow 88 is connected to the end of the pipe 87 and is, in turn, in fluid connection with the right hand end of the flexible hose 80 (FIG. 2A). The rigid pipes 82a, 87 and 88 are secured by a bracket 86 (FIG. 2A) to the beam 46 and the frame 13. Thus the flexible hoses 80 and 81 are divided and a flexing of one does not cause a flexing of the other.

The pipe 89 is supported in the boom 14 in a manner similar to the support for the pipe 41 of the conduit unit 16. Pipe 89 is connected to the hose 80 and is spaced above the upper surface of the support bracket 90 having a triangular truss brace 91 extending to the side plate 57 of the boom 14. As best seen in FIG. 2B, the outer end of the pipe 89 is captured between a pair of upper and lower rollers 92 and 92a journaled in a bracket 93 and a brace 94 for the bracket is secured to the side frame 57 of the boom 14. The rollers 92 and 92a function in the manner of the rollers 70 and 71 for the pipe 41 in that the rollers 92 and 92a permit the pipe 89 to adjust itself with expansion and contraction on the boom and without affording a large number of contact points for transferring of heat by conduction.

If desired, the frame 13 and the conduit means 15 may be locked in a given rotated position relative to the column 12; and, for this purpose, the rearward portion of the collar 30 is apertured at several locations to receive a locking plunger 94 (FIG. 1) secured to the column 12. More particularly, the locking plunger 94 is supported on a bracket 95 and is spring urged to extend upwardly through an aperture in the collar 30 to an apertured plate 96 secured as by welding to the stationary column 12. The plunger can be pulled downwardly against the spring force by pulling on a cable 97 to lower the plunger from an aperture in the collar 30 when it is desired to pivot the frame 13 horizontally about the axis 26. After pivoting, the frame 13 may be locked against rotational movement about the vertical axis 26.

As an aid to understanding the foregoing, a brief description of the operation of the fluid handling apparatus follows immediately hereinafter.

With the frame 13 unlocked for rotational movement about the axes 26 through the column 12, the couplers 21 and 22 of the respective conduit units 16 and 17 may be moved horizontally or vertically or universally, i.e., in a direction having both vertical and horizontal components of movement.

Assuming that the couplers 21 and 22 are moved downwardly and forwardly, as viewed in FIG. 1, the boom 14 rotates downwardly and in a counterclockwise direction about the axis 25 with the flexible hose section 38 and the flexible hose 80 both being bent in a single, vertical plane about the axis 25. The pivot pin 24 does not allow the boom 14 to twist in a horizontal direction which could cause a horizontal twisting or flexing of the hose portion 38 and the hose 80. Instead, the horizontally directed component of force exerted on the boom 14 is transmitted to the frame 13 to turn the same and to roll its rollers 31 and 33 in a counterclockwise direction about the peripheral surface of the column 12. Couplers 18 and 19 hold their respective hose sections 36 and 81 rigidly because of their connections to rigid conduits and to the column 12. As the frame 13 pivots about the axis 26, the hose sections 36 and 81 are flexed in a horizontal plane about the vertical axis 26 with the outer ends of the flexible hose sections being bent in a counterclockwise direction about the pivot axis 26. Thus, the movement of the couplers 21 and 22 have been broken into vertical and horizontal components of movement with the vertical component being about the axis 25 and the horizontal component being about axis 26.

In the embodiment of the invention illustrated in FIG. 3, a simplified and less expensive counter-balancing means 50a serves to support or counter-balance the cantilevered weight of a conduit means supported by the boom. In describing this embodiment, reference characters previously employed for a given element are used for the same or equivalent element except that a suffix "a" has been added. The conduit unit 16a is similar to the conduit unit 16, above described, in that a flexible metallic hose 35a and boom 14a are secured to a boom frame 13a which is pivotal about a support 11a including a vertical column 12a.

The cylindrical column 12a extends vertically from a pedestal type of base which is adapted to be secured to a stationary foundation. The boom frame 13a is mounted for pivotal movement about a vertical axis 26a defined by pivot pins 113 and 114 disposed in the bores of brackets 115 and 116 secured to the stationary column 12a. In this embodiment of the invention, the vertical axis 26a is offset from the centerline of the supporting column 12a.

The flexible hose 35a has a rearward flanged coupler 18a secured to a stationary bracket 45a on the column 12a. The forward end of the metallic flexible hose is secured by flange coupler 39a to a pipe 41a and the flexible hose is rigidly and securely clamped to the frame 13a intermediate the flange couplers 18a and 39a by a clamping bracket 37a. The clamping bracket thus effectively divides the unitary metallic flexible hose into a forward section 38a and a rearward section 36a with the rearward section disposed in the vertical plane of the axis 26a and the forward section in the plane of the horizontal axis 25a. It will be understood that a bending movement having vertical and horizontal components is broken into these components with vertical bending at the axis 25a and in forward hose section 36a and with horizontal bending at the axis 26a and in the rearward hose section 38a.

In order to relieve stress and strain on the pipes, hoses and pipe joints, the counter-balancing means 50a is connected between the frame 13a and the boom 14a. The counter-balancing means is connected to the boom through a truss having a forward brace 60a connected to the boom in a forward and outward location of the pivot pin 24a. Connected to the vertical leg 54a of the truss is a flexible band or cable member 135 which extends over a roller 141 to a connector 136 on the frame. A series of weights 138 are attached to the flexible band 135 at a catenary loop portion 140 of the flexible band 135. Preferably, the weights are detachably secured to the flexible band so that the amount of weight may be varied.

The counter-balancing means 50a will afford a variable amount of counter-balancing force with pivotal movement of the boom 14a about the pin 24a. For instance, when the boom is pivoted downwardly and in a counterclockwise direction, as viewed in FIG. 3, a foremost one 138a of the weights 138 moves upwardly toward the roller 141 and an increasing number of weights become disposed on the left side of the catenary loop and act to pivot the boom in clockwise direction about the pivot pin. With an increase in weight on the boom, a counterclockwise rotation of the boom straightens the catenary loop, and a number of weights 138 move from the right hand portion of the cantenary loop, at which the frame carries these weights, to the left hand portion of the cantenary loop, at which the boom carries these weights. Conversely, with a decrease in weight on the boom causing a clockwise rotation of the boom, the depth of the catenary loop increases with a transfer of weights from the left side to the right side of the catenary loop whereby less weights are effective on the boom 14a.

From the foregoing, it will be seen that the fluid handling apparatus avoids rotatable pipe joints but provides general universal movement for a conduit unit by breaking a movement into components for flexing metallic hose sections of spaced and normal axes. Also, a plurality of conduit units each may be bent at flexible hose sections disposed in the same plane at each of a pair of spaced and normal axes. Additionally, the weight of the boom and conduit unit cantilevered from the frame is counterbalanced to relieve stress and strain on the flanged couplers of the conduit units.

I claim as my invention:

1. In a fluid handling apparatus, the combination comprising, a support, a frame pivoted on said support for movement about a vertical axis, a boom having its inner end pivoted on said frame for movement about a horizontal axis spaced from said vertical axis, and a conduit unit having one end secured to said support and the other end secured to the outer end of said boom, said unit including longitudinally spaced flexible hose sections supported so that one section flexes about said vertical axis and the other section flexes about said horizontal axis.

2. The fluid handling apparatus of claim 1 including means for counter-balancing the weight of said boom, said means connecting said boom to said frame for applying a force opposing a pivoting of said boom due to its weight.

3. The fluid handling apparatus of claim 1 including means for counter-balancing the weight of said boom, said counter-balancing means being a weighted flexible member having one end anchored to said frame and the other end fixed to said boom at a point spaced above said horizontal axis so that the member hangs down freely in a catenary loop to provide a variable counter-balancing force with pivotal movement of said boom.

4. The apparatus of claim 1 in which said unit is a first unit and the combination includes a second conduit unit generally paralleling said first unit, said second unit having one end secured to said support and the other end secured to the outer end of said boom, and said second unit including longitudinally spaced flexible hose sections supported so that one section flexes about said vertical axis and the other section flexes about said horizontal axis.

5. The apparatus of claim 4 in which said second unit includes elbow pipe sections interconnecting said flexible boom section so that the sections are supported for flexing about said axes.

6. In a fluid handling apparatus, the combination comprising, a support, a frame having a first portion limited for pivoting about a first axis and a second portion limited for pivoting about a second axis normal to the first axis and spaced from the first axis, conduit means carried by said frame and having inlet and outlet connections, said conduit means including flexible metallic hose spanning each of said spaced axes, and means securing said metallic hose to said support intermediate said spaced axes and dividing said hose means into portions for flexing independently only about the axis spanned by the respective portion.

References Cited

UNITED STATES PATENTS

| 1,625,083 | 4/1927 | Hymans | 254—178 |
| 2,365,821 | 12/1944 | Horn | 254—178 |
| 2,803,269 | 8/1957 | Switzer | 141—387 |
| 3,217,748 | 11/1965 | Harper | 141—388 |

WILLIAM F. O'DEA, Primary Examiner

H. M. COHN, Assistant Examiner

U.S. Cl. X.L.

141—388; 212—48